May 16, 1961 J. W. HOLT 2,984,495
NIPPLE CHUCK
Filed Oct. 21, 1958

INVENTOR.
James W. Holt
BY Victor J. Evans & Co.
ATTORNEYS

United States Patent Office 2,984,495
Patented May 16, 1961

2,984,495

NIPPLE CHUCK

James W. Holt, 2102 7th St. NW., Albuquerque, N. Mex.

Filed Oct. 21, 1958, Ser. No. 768,618

2 Claims. (Cl. 279—7)

This invention relates to a nipple chuck.

The object of the invention is to provide a chuck which is adapted to conveniently hold a work piece such as a nipple as for example when such a nipple is being threaded.

Another object of the invention is to provide a chuck which will conveniently hold a nipple while the nipple is being threaded, and wherein damage to the nipple is prevented, the device being constructed so that the nipple can be securely locked in place, and wherein a means is provided for readily releasing the nipple from the chuck.

A further object of the invention is to provide a nipple chuck which is extremely simple and inexpensive to manufacture.

Other objects and advantages will be apparent in the course of the following description.

In the accompanying drawing, forming a part of this application, and wherein like numerals indicating like parts throughout the same.

Figure 1:
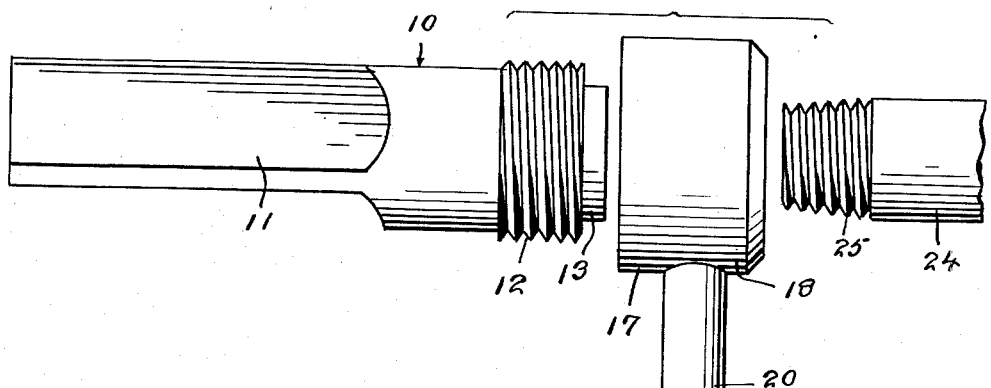
Figure 1 is an elevational view illustrating the nipple chuck of the present invention, and with parts disassembled.
Figure 2:
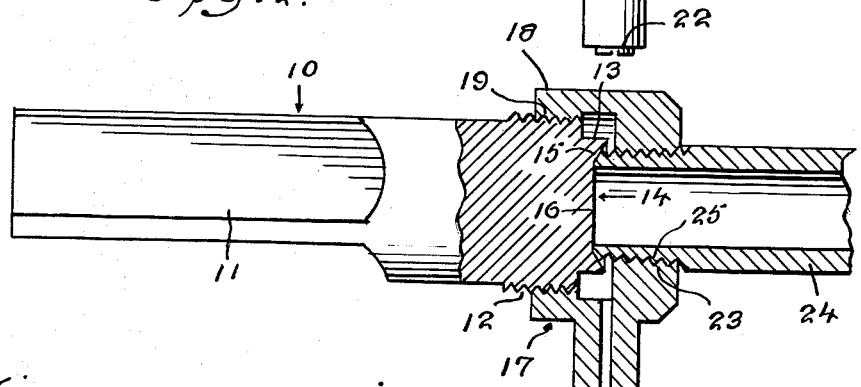
Figure 2 is a view similar to Figure 1, but showing the parts assembled, and with parts broken away and shown in section.

Referring in detail to the drawing, the nipple chuck of the present invention is shown to comprise a body member which is indicated generally by the numeral 10 and the body member 10 includes an end portion which is provided with a plurality of angularly arranged flat surfaces 11, Figures 1 and 2. The body member 10 is further provided with an externally threaded portion 12 and the body member 10 also includes a cylindrical shoulder 13 which is arranged contiguous to the threaded portion 12. The numeral 14 indicates a recess which is arranged in an end of the body member 10, and the recess 14 is shaped to include an outer inclined section 15 as well as an inner central section 16.

The numeral 17 indicates a locking member which includes a cylindrical collar 18. The collar 18 is provided with a first threaded section 19 which threadedly engages the portion 12 of the body member 10. Extending outwardly from the collar 18 and secured thereto or formed integral therewith is a shank or handle 20 which is provided with a longitudinally extending passageway 21 through which lubricant is adapted to pass. The numeral 22 indicates a plug which is arranged in the outer end of the shank 20, and by removing the plug 22, additional lubricant or oil can be arranged to flow in the passageway 21 in order to properly lubricate the various parts.

Figures 3, 4:
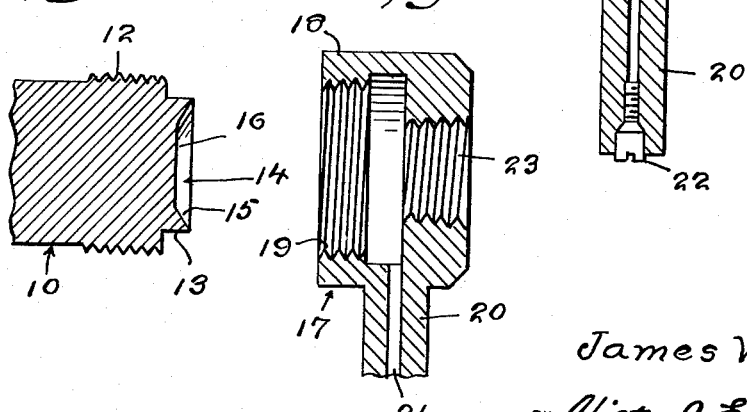
Figure 3 is a fragmentary sectional view illustrating an end of the body member.
Figure 4 is a fragmentary sectional view illustrating the locking member.

The collar 18 is further provided with a second threaded section 23 which is tapered as shown in Figure 4 for example, and the numeral 24 indicates a nipple which has a threaded end portion 25 threadedly engaging the second threaded section 23 of the collar 18. When the parts are assembled as shown in Figure 2, an end of the nipple 24 engages the recess 14 and the inclined section 15 provides a locking or camming action when the member 17 is tightened so that the nipple 24 will be properly held, as for example when the nipple 24 is being threaded.

From the foregoing, it is apparent that there has been provided a nipple chuck which is adapted to be used in holding a nipple such as the nipple 24 when the nipple is to be threaded or worked on. In use, the flattened end portions 11 of the body member 10 are adapted to be gripped in a conventional vise or the like, and then by arranging the threaded end 25 of the nipple 24 in threaded engagement with the threaded section 23 of the collar 18 and then tightening the locking member 17, it will be seen that the nipple will be locked in the chuck. Thus, the nipple 24 can be threaded or otherwise worked on and the nipple will be held in such a manner that it will not accidently come loose and also the nipple is held so that damage thereto is prevented.

It is to be noted that when the locking member 17 is tightened by means of the handle or shank 20, the end of the nipple 24 will be wedged or jammed into the recess 14 due to the provision of the flat central portion 16 in the outer tapered portion 15, and this provides a locking action which insures that the nipple will not accidently come loose. However, after the work on the nipple 24 is completed, it is only necessary to manually grip the shank 20 and rotate the locking member 17 in the opposite direction so that the nipple 24 will be loosened whereby the same can then be readily unscrewed from the section 23 of the collar 18.

The parts can be made of any suitable material and in different shapes or sizes.

As previously stated, by removing the plug 22, lubrication can be arranged in the passageway 21, so that the various inner parts can be properly lubricated or oiled.

The chuck is adapted to be made in different sizes depending upon the particular size of pipe or nipple being handled or worked on. Also the parts are firmly made of case hardened steel so as to insure long life and rugged construction.

The portion 11 of the body member 10 is adapted to be held in a universal or jaw chuck of a conventional pipe vise. The present invention will facilitate the threading of the unthreaded end of a nipple and marring or damage to the nipple will be prevented.

I claim:

1. In a chuck, a body member including an end portion provided with a plurality of angularly arranged longitudinally extending flat surfaces, said body member being provided with an externally threaded portion, a cylindrical shoulder on an end of said body member contiguous to said threaded portion, there being a recess in the end of said body member adjacent said shoulder, said recess being shaped to include an inner flat section and an outer inclined section, a locking member including a cylindrical collar provided with a first threaded section threadedly engaging the threaded portion of said body member, said collar being further provided with a second threaded section which is tapered and is of smaller diameter than said first threaded section, and a nipple having a threaded end threadedly engaging said second threaded section and abutting the recess in said body member.

2. In a chuck, a body member including an end portion provided with a plurality of angularly arranged longitudinally extending flat surfaces, said body member being provided with an externally threaded portion, a cylindrical shoulder on an end of said body member contiguous to said threaded portion, there being a recess in the end of said body member adjacent said shoulder, said recess being shaped to include an inner flat section and an outer inclined section, a locking member including a cylindrical collar provided with a first threaded section threadedly engaging the threaded portion of said body member, said collar being further provided with a second threaded section which is tapered and is of smaller diameter than said first threaded section, and a nipple having a threaded end threadedly engaging said second threaded section and abutting the recess in said body member, a shank extending outwardly from said collar and provided with a longitudinally extending lubrication receiving passageway therein, and a plug for selectively colsing the outer end of the passageway.

References Cited in the file of this patent
UNITED STATES PATENTS

| | | |
|---|---|---|
| 429,832 | Aschenbach | June 10, 1890 |
| 540,989 | Keyes | June 11, 1895 |
| 1,115,912 | Dodson | Nov. 3, 1914 |
| 2,345,604 | Jackson | Apr. 4, 1944 |
| 2,702,715 | Andrews | Feb. 22, 1955 |